United States Patent Office 2,809,711
Patented Oct. 15, 1957

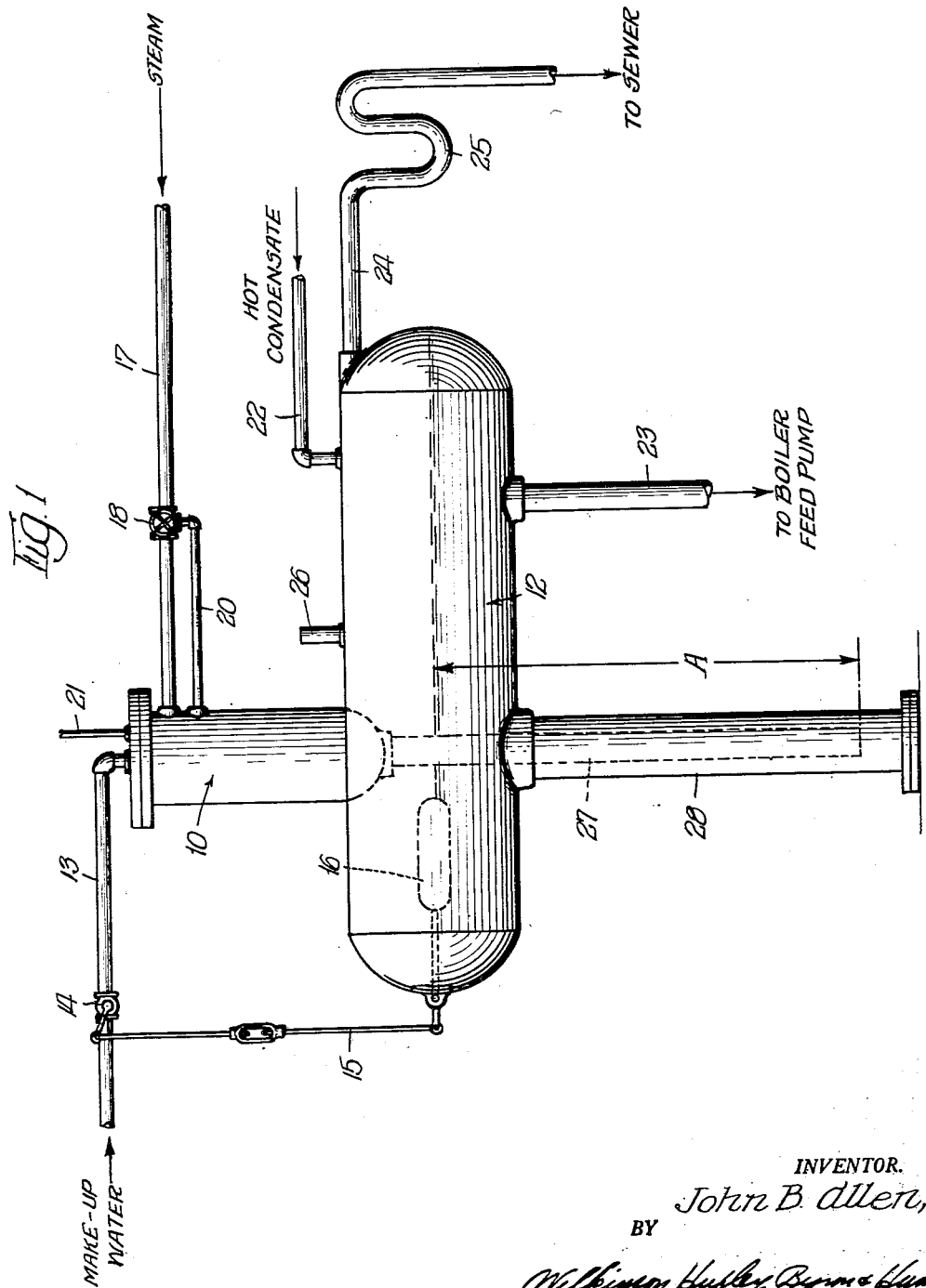

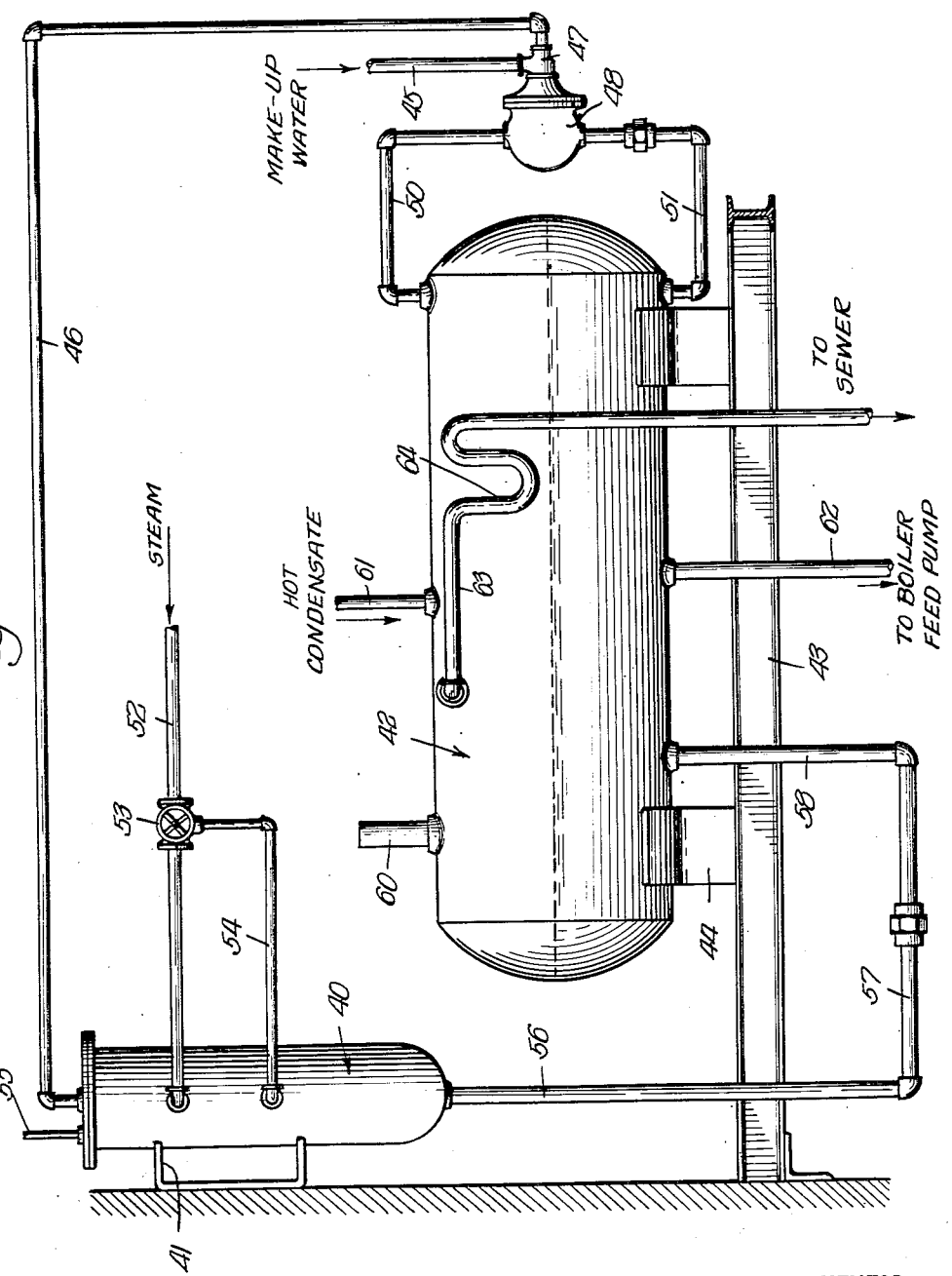

2,809,711

FEED WATER DEAERATORS

John B. Allen, Chicago, Ill.

Application May 16, 1955, Serial No. 508,580

7 Claims. (Cl. 183—2.5)

The invention relates to the deaeration of boiler feed water and has reference more particularly to a new and improved method and apparatus whereby boiler feed water is heated to saturation temperature for deaerating the same under pressure and which is then delivered to an open receiver in a manner that prevents flashing.

Water below the saturation temperature of steam normally contains in solution certain gases such as oxygen and carbon dioxide whose solubility approaches zero as the temperature of the water approaches saturation. In the usual deaerator these gases are removed by heating the water in a finely divided state to saturation temperature through direct contact with steam under pressure and in utilizing the steam flow within the apparatus to carry the released gases to a vent opening. In order to maintain the steam atmosphere necessary for heating and deaeration, a deaerator of this type must be maintained above atmospheric pressure at all times. As a result deaerating apparatus must be contained wtihin pressure vessels which are expensive as contrasted to open or non-pressure tanks.

Also it is customary practice to deaerate all boiler feed water, both the cold make-up water as well as the returned condensate which is usually hot enough so that it contains only relatively small amounts of non-condensible gas. The custom of sizing a deaerator for full boiler requirements together with the necessity for using a comparatively large expensive pressure vessel puts the benefits of deaerated, non-corrosive boiler feed water beyond the reach of many plants, thus increasing their maintenance cost and wasting material resources through preventable corrosion in boilers and boiler feed and return lines.

Accordingly, one of the main objects of the invention is to effect substantial economy in the deaeration of boiler feed water by providing an adequate and highly efficient system characterized by the use of storage tanks of the ordinary atmospheric pressure type that can be installed at a reduced cost.

A further object of the invention resides in the provision of improved apparatus for heating and deaerating a minor portion only of the boiler feed water such as the cold make-up water, and which apparatus will thereafter deliver the deaerated water to an open tank or receiver containing the relatively hot condensate so as to co-mingle the two waters but whereby flashing of the deaerated make-up water is effectively prevented.

A more specific object of the invention is to provide apparatus which will heat and deaerate make-up water by directly contacting the water with steam in an inexpensive pressure vessel and which will thereafter effect delivery of the heated and deaerated water to an atmospheric condensate tank through a water leg capable of operating in a manner to prevent flashing of said deaerated water.

Additional objects of the invention are to provide a deaerating system designed for processing make-up water only but which will give from fifty percent to ninety percent of all the benefits to be derived from a complete deaeration system, to provide a deaeration system which will be highly efficient in operation and considerably less expensive to install so that smaller plants can well afford to make use of the same, and to provide a deaerating system which can be sold either as new equipment or as an auxiliary addition to existing equipment.

With these and various other objects in view, the invention may consist of certain novel features of construction and operation as will be more fully described and particularly pointed out in the specification, drawings and claims appended thereto.

In the drawings which illustrate an embodiment of the invention, and wherein like reference characters are used to designate like parts—

Figure 1 is a view in side elevation of a deaerating system embodying the improved features of the present invention; and Figure 2 is a view in side elevation of a modified form of deaerating system coming within the invention.

Referring to the drawings and in particular to Figure 1, the deaerating tank is indicated by numeral 10, and the tank for containing the hot condensate is designated by numeral 12. The cool make-up water is delivered to the deaerator tank through the inlet pipe 13, the said pipe having valve 14 interposed therein and which is float controlled by linkage 15 from float 16, which has location within tank 12. Steam is admitted to the deaerator tank 10 through the steam inlet pipe 17, the said pipe having interposed therein the pressure reducing valve 18. Said pressure reducing valve is automatically controlled by pressure from within the deaerator tank and which is communicated to the valve through pipe 20. The pressure reducing valve is set so as to maintain a steam pressure within the deaerator tank of several pounds per square inch above atmospheric pressure. As a general rule, the deaerator tank will be operated at a pressure above atmospheric of from one to two pounds, which has been found entirely satisfactory for heating and thoroughly deaerating the make-up water. The steam is discharged from the deaerator tank 10 through the vent orifice 21 and along with said steam flow there is also discharged the non-condensable gases released from the water.

The tank 12 is supplied with hot condensate returning from the boiler through pipe 22 and the said hot condensate together with any deaerated make-up water which may be added thereto is returned to the boiler by way of the feed pump through pipe 23. It will be noted that the hot condensate enters the tank 12 in an uncontrolled manner, all of which is standard practice, and should an excess of hot condensate be received by the tank, the same will be discharged therefrom through the overflow pipe 24 having the trap 25 therein and which leads to the sewer. Whereas, the hot condensate is delivered to tank 12 in an uncontrolled manner, the deaerated make-up water is admitted in a controlled manner through actuation of float 16. As previously explained, the said float is connected by linkage 15 to valve 14 and therefore make-up water is delivered to tank 12 only when the level of the water in the tank drops below a certain predetermined level.

Since the tank 12 is open to the atmosphere at all times by reason of the vent opening 26, it is necessary to deliver the hot and deaerated make-up water to the tank in a manner which prevents flashing of the deaerated water or otherwise the said deaerated water would flash off as steam and the same would be lost to the system. This is accomplished in accordance with the present invention by connecting the deareating tank 10 with the storage or condensate tank 12 by means of a water leg formed by the depending and telescoping pipes 27 and 28. The pipe 27 connects with the bottom of deaerator tank 10 and depends therefrom, having a portion which is located within tank 12, whereas the remainder of pipe 27 extends within so as to have telescoping relation with pipe 28. This last mentioned pipe, namely, 28, may be described as a standpipe since the same connects with the bottom of storage tank 12 and may also be employed in a manner to function as a support or standard for said storage tank. Due to the location of pipe 27 within pipe 28, the deaerated water from tank 10 must flow downwardly through the entire length of pipe 27 and then upwardly within pipe 28 in order to reach the storage tank 12.

By introducing the deaerated water below the cooler water within the storage tank opportunity is provided for the deaerated water to mix and cool below the atmospheric flash point before rising to the surface. When the deaerator tank is operated at a steam pressure of one pound per square inch above atmospheric, the temperature of the deaerated water will not exceed 216 degrees Fahr., so that a temperature depression of only 4 degrees Fahr. is required to cool the deaerated water below the atmospheric flash point. In normal plant operation the hot condensate is very seldom returned to the storage tank at a temperature greater than 180 degrees Fahr. Nevertheless, depending on the relative volumes of condensate and make-up water, the former could be returned as high as 205 to 210 degrees Fahr., and it would still be able to cool the deaerated make-up water to 212 degrees Fahr. However, should the condensate be returned at such a high temperature or in such low volume as to be unable to cool the deaerated water to 212 degrees Fahr., it is always possible to use a temperature regulating valve controlled by the temperature in tank 12 and admit into pipe 28 the relatively small quantity of colder water such as may be necessary to hold the temperature of the water flowing upwardly into the open storage tank at 212 degrees Fahr., or below. A further safeguard against flashing of the deaerated water in the storage tank resides in the size selected for the pipe 28. This is deliberately oversized in order to keep the upward velocity quite low so as to provide for temperature depression by heat loss due to radiation.

In the deaeration system of Figure 1, make-up water or other comparatively cool feed water is heated and deaerated in the small inexpensive pressure vessel 10 under a low steam pressure automatically controlled by the reducing valve 18. When the storage tank 12 calls for water, the hot deaerated water from tank 10 is delivered thereto through the water leg which will have sufficient length to hold against the steam pressure in the deaerator. Also it will be observed that the hot deaerated water is delivered into the bottom of the open storage tank and below the condensate stored therein so that both waters are caused to mix with equalization of their temperatures. The telescoping pipes 27 and 28 can be constructed of a length depending on the pressure desired in the deaerator tank 10. As a general rule the length of the water leg must be in the neighborhood of two and one-half feet for each pound of pressure above atmospheric. For example, if the distance denoted by A should be five feet, the same would be satisfactory for pressures in the deaerator not exceeding two pounds. Accordingly, water will be fed from the deaerator through the leg and up into the storage tank maintained at atmospheric pressure and with the avoidance of flashing or any loss of heat such as would occur on account of flashing.

In the modification of the invention as shown in Figure 2, the deaerator tank 40 is suitably supported from a wall or the like by the bracket 41, whereas the storage or condensate tank 42 is supported by the structural beam 43 through interposed standards such as 44. The cool make-up water is delivered to the deaerator tank through the inlet pipes 45 and 46, the said pipes connecting at 47 with the float controller 48. A pipe 50 connects the top end of the float controller with the top of the condensate tank 42, whereas pipe 51 connects the bottom of the controller with the bottom of said condensate tank. The float mechanism incorporated in the float controller 48 is responsive to the liquid level within the condensate tank 42 so that make-up water is admitted to pipe 46 and thus to the deaerator 40 only when the liquid is below a predetermined level. Steam is admitted to the deaerator tank through the steam inlet pipe 52 having the pressure reducing valve 53 interposed therein and which valve is automatically controlled by pressure from within the deaerator tank communicated thereto through pipe 54. The top of the deaerator tank 40 is vented by means of the vent orifice 55 and the pipes 56, 57 and 58 comprise the water leg connecting the bottom of the deaerator tank with the bottom of the storage or condensate tank.

The said tank 42 is vented to the atmosphere at all times through the vent opening 60, and hot condensate returning from the boiler is freely delivered to the tank in an uncontrolled manner by pipe 61. The water from tank 42 is delivered to the boiler feed pump through the pipe 62 and should excess liquid be discharged into the tank the same can overflow to the sewer by means of pipe 63, having the liquid trap 64 interposed therein.

The mode of operation of the modified deaerating system of Figure 2 is substantially the same as described in connection with Figure 1. The deaerator tank 40 is maintained at a pressure of one or two pounds above atmospheric by proper adjustment of the pressure reducing valve 53. The make-up water delivered thereto is thus heated by direct contact with steam and is accordingly thoroughly deaerated. Since the heating and deaeration is carried out under a pressure above atmospheric, the make-up water will attain a temperature above 212 degrees Fahr. and thus the water is too hot for discharge into the storage tank 42 unless some means are provided to prevent flashing. This is accomplished by the water leg comprising the pipes 56, 57 and 58. As a result of this structural feature the hot deaerated water is delivered into the bottom of the open storage tank and below the condensate stored therein, so that both waters are caused to mix, with equalization of their temperatures. Also, it will be understood that the water leg has sufficient length to hold up against the steam pressure in the deaerator.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a deaerating system for deaerating boiler feed water, the combination including an atmospheric storage tank, an inlet pipe for the said storage tank for freely delivering thereto in an uncontrolled manner the hot water being discharged by the system as condensate, an outlet for the storage tank for delivering the contents of the storage tank to the boiler feed pump, a deaerator tank located above the storage tank, a steam inlet pipe incorporating a pressure reducing valve and having connection with the deaerator tank, an inlet pipe for make-up water also having connection with the deaerator tank, and means connecting the bottom of the deaerator tank with the bottom of the storage tank and providing a passage through which the water in the deaerator tank may flow into the storage tank, said means also providing a water leg of sufficient height to maintain the desired steam pressure within the deaerator tank.

2. A deaerating system for deaerating boiler feed water as defined by claim 1, additionally including a valve interposed in the inlet pipe for the make-up water, and float mechanism responsive to the level of the water in the storage tank for controlling the said valve.

3. In a deaerating system for deaerating boiler feed water, the combination including an atmospheric storage tank, an inlet pipe for the said tank for freely delivering thereto in an uncontrolled manner the water returned from the boiler as condensate, an outlet for the storage tank for delivering the contents of the storage tank to the boiler feed pump, a deaerator tank of the pressure type located in a plane above the storage tank, an inlet pipe for admitting make-up water to the deaerator tank, a steam inlet pipe incorporating a pressure reducing valve and also having connection with the deaerator tank, said deaerator tank also having a vent orifice of restricted size for venting said tank, and means connecting the bottom of the deaerator tank with the bottom of the storage tank and providing a passage through which the water in the deaerator tank may flow into the storage tank, said means also providing a water leg of sufficient height to maintain the desired steam pressure within the deaerator tank.

4. A deaerating system for deaerating boiler feed water as defined by claim 3, additionally including an overflow pipe for the storage tank.

5. In a deaerating system for boiler feed water, the combination including an atmospheric storage tank for receiving the condensate returned from the boiler, an outlet pipe for the storage tank for delivering the contents of the tank to the boiler feed pump, a pressure deaerator tank located in a plane above the storage tank, an inlet pipe for admitting make-up water to the deaerator tank, a steam inlet pipe also having connection with the deaerator tank, whereby the make-up water is heated within the deaerator tank by direct contact with steam and is deaerated under pressure, and means connecting the bottom of the deaerator tank with the bottom of the storage tank, said means including a series of pipes providing a passage through which the water in the deaerator tank may flow into the storage tank, and said means also providing a water leg of sufficient height to maintain the required steam pressure within the deaerator tank, whereby the water from the deaerator tank is delivered to the storage tank in a manner which prevents flashing of the deaerated water.

6. A deaerating system for deaerating boiler feed water as defined by claim 5, additionally including a valve interposed in the inlet pipe for the make-up water, and float mechanism responsive to the level of the water in the storage tank for controlling the said valve.

7. In a deaerating system for boiler feed water, the combination including an atmospheric storage tank for receiving the water returned from the boiler as condensate, an outlet for the storage tank for delivering the contents of the storage tank to the boiler feed pump, a deaerator tank of the pressure type having a supported relation on the top wall of the storage tank and being thereby located in a plane above the storage tank, an inlet pipe for admitting make-up water to the deaerator tank, a steam inlet pipe also having connection with the deaerator tank, and means providing a passage through which the water in the deaerator tank may flow into the storage tank, said means including a large diameter pipe depending from the bottom of the storage tank and a pipe of smaller diameter depending from the deaerator tank and extending within the large diameter pipe so as to terminate close to the bottom end thereof, the said arrangement of pipes providing a water column of sufficient height to maintain the required pressure within the deaerator tank.

References Cited in the file of this patent

UNITED STATES PATENTS

| 1,914,166 | Rohlin | June 13, 1933 |
| 2,138,354 | Rohlin | Nov. 29, 1938 |